United States Patent
Iida et al.

(10) Patent No.: US 11,566,658 B2
(45) Date of Patent: Jan. 31, 2023

(54) HALF BEARING AND SLIDING BEARING

(71) Applicant: DAIDO METAL COMPANY LTD., Nagoya (JP)

(72) Inventors: Daiki Iida, Inuyama (JP); Yasushi Saito, Inuyama (JP)

(73) Assignee: DAIDO METAL COMPANY LTD., Nagoya (JP)

( * ) Notice: Subject to any disclaimer, the term of this patent is extended or adjusted under 35 U.S.C. 154(b) by 0 days.

(21) Appl. No.: 17/587,305

(22) Filed: Jan. 28, 2022

(65) Prior Publication Data
US 2022/0260110 A1  Aug. 18, 2022

(30) Foreign Application Priority Data

Feb. 12, 2021  (JP) ............................. JP2021-020837

(51) Int. Cl.
*F16C 9/02*  (2006.01)
*F16C 9/04*  (2006.01)
(Continued)

(52) U.S. Cl.
CPC .................. *F16C 9/02* (2013.01); *F16C 3/14* (2013.01); *F16C 9/04* (2013.01); *F01M 11/02* (2013.01)

(58) Field of Classification Search
CPC .. F16C 9/02; F16C 9/04; F16C 17/022; F16C 33/1065; F16C 2360/22; F16C 3/14; F01M 11/02; F01M 2011/026
See application file for complete search history.

(56) References Cited

U.S. PATENT DOCUMENTS

2011/0058761 A1\*  3/2011  Ishigo ................... F16C 33/046
                                                        384/288
2013/0343682 A1\* 12/2013  Garnier ............... F16C 33/1065
                                                        384/322

FOREIGN PATENT DOCUMENTS

JP    H07-18051 U    3/1995
JP    H08-277831 A   10/1996
(Continued)

*Primary Examiner* — Syed O Hasan
(74) *Attorney, Agent, or Firm* — Harness, Dickey & Pierce, P.L.C.

(57) ABSTRACT

Provided is a half bearing constituting a sliding bearing for a shaft member of an internal combustion engine that is unlikely to cause seizure in a sliding surface even if deflection or whirling of the shaft member occurs during an operation of the internal combustion engine. In a half bearing that constitutes a sliding bearing, a plurality of circumferential-direction grooves are formed to be adjacent to each other in a sliding surface including first and second curved surfaces with different curvatures, the sliding surface includes a plane portion that is parallel to an axial line direction and an inclined surface portion that is adjacent to the plane portion, the inclined surface portion is displaced from the plane portion toward an end portion of the sliding surface in the axial line direction such that the sliding surface successively comes close to a back surface, positions of maximum groove depths of the circumferential-direction grooves are located on groove center lines, the groove center lines in the inclined surface portion of the sliding surface are inclined relative to a vertical line toward the end portion of the sliding surface in the axial line direction, a groove inclination angle of the circumferential-direction grooves that are closest to the plane portion is a minimum angle, and the groove inclination angle successively increases toward the end portion of the sliding surface in the axial line direction.

11 Claims, 9 Drawing Sheets

(51) Int. Cl.
*F16C 3/14* (2006.01)
*F01M 11/02* (2006.01)

(56) References Cited

FOREIGN PATENT DOCUMENTS

| | | | | |
|---|---|---|---|---|
| JP | 2004-92448 A | 3/2004 | | |
| JP | 2009257371 | * 11/2009 | ................ | F16C 9/02 |
| JP | 2011-58568 A | 3/2011 | | |
| JP | 2014-516144 A | 7/2014 | | |
| WO | WO-2010038588 A1 | 4/2010 | | |

* cited by examiner (RELATED ART)

HALF BEARING AND SLIDING BEARING

INCORPORATION BY REFERENCE

The present application claims priority from JP Patent Application Ser. No. 2021-20837 filed on Feb. 12, 2021, the content of which is hereby incorporated by reference into this application.

BACKGROUND OF THE INVENTION

(1) Field of the Invention

The present invention relates to a half bearing constituting a sliding bearing that supports a crankshaft or the like of an internal combustion engine. The present invention also relates to a sliding bearing with a cylindrical shape that includes the half bearing and supports a crankshaft or the like of an internal combustion engine.

(2) Description of Related Art

A crankshaft of an internal combustion engine is supported at its journal portion by a cylinder block lower portion of the internal combustion engine via a main bearing constituted by a pair of half bearings. For the main bearing, a lubricant ejected by an oil pump is fed from an oil gallery formed in a cylinder block wall into a lubricant groove formed along an inner circumferential surface of the main bearing through a through-hole formed in a wall of the main bearing. Also, a first lubricant path is formed in a penetrating manner in a diameter direction of the journal portion, and openings at both ends of the first lubricant path communicate with the lubricant groove of the main bearing. Moreover, a second lubricant path passing through a crank arm portion is formed to be branched from the first lubricant path at the journal portion, and the second lubricant path communicates with a third lubricant path formed to penetrate in a diameter direction of a crank pin. In this manner, the lubricant fed from the oil gallery in the cylinder block wall into the lubricant groove formed in the inner circumferential surface of the main bearing through the through-hole passes through the first lubricant path, the second lubricant path, and the third lubricant path and is supplied from an ejection port opened at an end of the third lubricant path to a part between a crank pin and a sliding surface of a conrod bearing constituted by the pair of half bearings (see JP-A-8-277831, for example). The oil is supplied to a part between a surface of the crankshaft and the sliding surface of the conrod bearing.

The bearing constituted by the pair of half bearings is also used for a link mechanism portion of a variable compression ratio device and a balancer mechanism portion of a balancer device of an internal combustion engine (see JP-A-2004-92448 and Japanese Utility Model Laid-Open No. 7-18051, for example).

Also, A half bearing in which a sliding surface is constituted by a curved surface formed along two types of arcs with different curvatures, a plurality of circumferential-direction grooves are formed in each of a first curved surface including a circumferential-direction center portion of the half bearing and second curved surfaces on both sides of the first curved surface in the circumferential direction, and the depth and the groove sectional area of the circumferential-direction grooves in the second curved surface are larger than the depth and the groove sectional area of the circumferential-direction grooves in the first curved surface is used (JP-A-2011-58568, for example).

In the related art, a half bearing including a crowning constituted by an inclined surface at one of or both end portions of a sliding surface in an axial line direction has been proposed to alleviate local and strong collision (contact) of a part near the end portion of the sliding surface of the half bearing in the axial line direction against a shaft member, such as a crankshaft, due to occurrence of deflection or whirling of the shaft member during an operation of an internal combustion engine (see International Publication No. WO 2010/038588 and JP-A-2014-516144, for example).

In recent years, there is a trend that shaft members have lower rigidity due to weight reduction of internal combustion engines, and the amounts of deflection and the amounts of shaking of the shaft members during operations of the internal combustion engine have increased. Therefore, the half bearing including a crowning as proposed in International Publication No. WO 2010/038588 and JP-A-2014-516144 also has a problem that a high temperature is likely to be achieved due to direct contact between the part near the end portion of the sliding surface in the axial line direction and the shaft member and seizure is likely to occur in the sliding surface.

BRIEF SUMMARY OF THE INVENTION

An object of the present invention is to provide a half bearing constituting a sliding bearing for a shaft member of an internal combustion engine that is unlikely to cause seizure in a sliding surface even if deflection or whirling of the shaft member occurs during an operation of the internal combustion engine and the sliding bearing.

In order to solve the aforementioned problem, the present invention provides a half bearing constituting, by a combination of a pair of half bearings, a sliding bearing with a cylindrical shape, in which the half bearing has a semi-cylindrical shape and has a back surface on an outer circumferential surface side and a sliding surface on an inner circumferential surface side, the sliding surface includes first and second curved surfaces formed along two types of arcs with different curvatures, the first curved surface being a region including a circumferential-direction center portion of the sliding surface, the second curved surfaces being two remaining regions of the sliding surface that are continuous from the region of the first curved surface and extend toward both circumferential-direction end surfaces of the half bearing, and as a relationship between a center (C1) of a first arc that forms the first curved surface and a center (C2) of a second arc that forms the second curved surfaces, the center (C2) of the second arc being located at a position deviating further outward than the center (C1) of the first arc on a center line passing through a circumferential-direction center of the half bearing and the center (C1) of the first arc, formation ranges of the second curved surfaces are ranges at a circumferential angle θ2 of 20° at a minimum and 50° at a maximum from the circumferential-direction end surfaces of the half bearing around the center (C1) of the first arc, a plurality of circumferential-direction grooves are formed to be adjacent to each other in the sliding surface, the plurality of circumferential-direction grooves in the first curved surface of the sliding surface being first circumferential-direction grooves, the plurality of circumferential-direction grooves in the second curved surfaces of the sliding surface being second circumferential-direction grooves, the plurality of first circumferential-direction grooves are formed over an entire length of the first curved surface in the circumferential direction, and the plurality of first circumferential-direction grooves are formed over an entire width of the first curved surface, the plurality of second circumferential-direction grooves are formed over entire lengths of the second curved surfaces in the circumferential direction, and the plurality of second circumferential-direction grooves are formed over entire widths of the second curved surfaces, the first and second circumferential-direction grooves have curved recessed surfaces when seen in a section of the half bearing in an axial line direction, apex portions being formed between the recessed surfaces of the adjacent circumferential-direction grooves, a line connecting the apex portions representing the sliding surface, the sliding surface includes a plane portion that is parallel to the axial line direction and an inclined surface portion that is adjacent to the plane portion, the inclined surface portion being located at one of or both end portions of the sliding surface in the axial line direction, the inclined surface portion being displaced from the plane portion toward the end portion of the sliding surface in the axial line direction such that the sliding surface successively comes close to the back surface, and the inclined surface portion is formed over at least a part of a length of the sliding surface in the circumferential direction, in which groove widths of the first and second circumferential-direction grooves are defined as lengths of imaginary straight lines linearly connecting apex portions on both sides of the first and second circumferential-direction grooves, groove center lines are defined as lines that pass through center positions of the lengths of the imaginary straight lines and extend in a normal direction with respect to the imaginary straight lines, groove depths of the first and second circumferential-direction grooves are defined as lengths to positions at which the recessed surfaces are the furthest from the imaginary straight lines in the normal direction with respect to the imaginary straight lines, and positions of maximum groove depths of the first and second circumferential-direction grooves are located on the groove center lines, areas that are surrounded by the imaginary straight lines and the recessed surfaces are defined as groove sectional areas, the plurality of first circumferential-direction grooves have the same groove widths, the same groove depths, and the same groove sectional areas, the groove widths, the groove depths, and the groove sectional areas of the first circumferential-direction grooves are the same at any position of the first curved surface in the circumferential direction, the plurality of second circumferential-direction grooves have the same groove widths, the same groove depths, and the same groove sectional areas, and the groove widths, the groove depths, and the groove sectional areas of the second circumferential-direction grooves are the same at any position of the second curved surfaces in the circumferential direction, the groove depths and the groove sectional areas of the second circumferential-direction grooves are larger than the groove depths and the groove sectional areas of the first circumferential-direction grooves, an angle formed by a vertical line extending in the vertical direction from the plane portion of the sliding surface toward an axial line of the half bearing and the groove center lines of the first and second circumferential-direction grooves is defined as a groove inclination angle $\theta 1$, and the groove inclination angle $\theta 1$ in the plane portion of the sliding surface is $0°$, and the groove center lines of the first and second circumferential-direction grooves in the inclined surface portion of the sliding surface are inclined relative to the vertical line toward the end portion of the sliding surface in the axial line direction, the groove inclination angle $\theta 1$ of the first and second circumferential-direction grooves that are closest to the plane portion is a minimum angle, and the groove inclination angle $\theta 1$ successively increases toward the end portion of the sliding surface in the axial line direction.

According to another embodiment of the present invention, when the inclined surface portions are located at both end portions in the axial line direction, the inclined surface portions are formed symmetrically with respect to a center of the sliding surface in a width direction.

According to another embodiment of the present invention, a maximum width of the inclined surface portion is a length corresponding to 2 to 10% of a width of the sliding surface.

According to another embodiment of the present invention, at a position where the inclined surface portion has a maximum width, a depth of the inclined surface portion is 2 to 10 μm, and here, the depth of the inclined surface portion is a difference (T−T1) between a wall thickness T of the plane portion and a wall thickness T1 of the inclined surface portion at the end portion of the sliding surface in the axial line direction.

According to another embodiment of the present invention, the inclined surface portion has a maximum width and a maximum depth at a center portion of a length of the half bearing in the circumferential direction, and here, the depth of the inclined surface portion is a difference (T−T1) between a wall thickness T of the plane portion and a wall thickness T1 of the inclined surface portion at the end portion of the sliding surface in the axial line direction, and the width and the depth of the inclined surface portion successively decrease toward both end portions of the length of the half bearing in the circumferential direction.

According to another embodiment of the present invention, the inclined surface portion has a parallel portion with a constant length in the axial line direction at a position including the center portion of the length of the half bearing in the circumferential direction.

According to another embodiment of the present invention, the groove depth D1 of the first circumferential-direction grooves is 1.5 to 5 μm, the groove depth D2 of the second circumferential-direction grooves is two to five times as large as the groove depth D1 of the first circumferential-direction grooves.

According to another embodiment of the present invention, the groove widths of the first and second circumferential-direction grooves are 0.05 to 0.25 mm.

According to another embodiment of the present invention, at a position where the inclined surface portion has a maximum width, the groove inclination angle $\theta 1$ of the first and second circumferential-direction grooves in the inclined surface portion that are closest to the end portion of the sliding surface in the axial line direction is $3×10-2°$ to $30×10-2°$.

According to another aspect of the present invention, there is provided a sliding bearing with a cylindrical shape that supports a shaft member of an internal combustion engine, the sliding bearing including: any of the aforementioned half bearings.

Also, according to another embodiment of the present invention, the sliding bearing is constituted by combining a pair of the half bearings.

BRIEF DESCRIPTION OF THE SEVERAL
VIEWS OF THE DRAWINGS

DETAILED DESCRIPTION OF THE INVENTION

Hereinafter, specific examples of the invention of the present application will be described with reference to the drawings.

Figure 1:
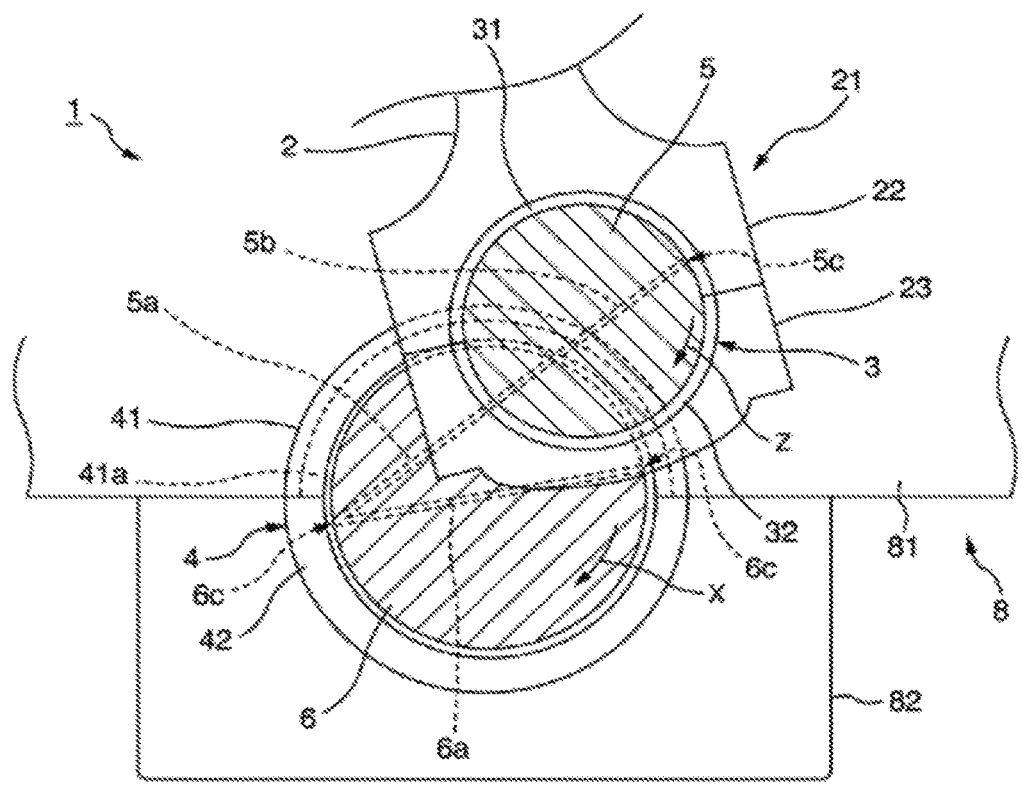
FIG. 1 is a schematic view illustrating a bearing device of a crankshaft.

FIG. 1 schematically illustrates a bearing device 1 of an internal combustion engine. The bearing device 1 includes journal portions 6 supported at a lower portion of a cylinder block 8, crank pins 5 that are formed integrally with the journal portions 6 and rotate about the journal portions 6, and a conrod 2 that transmits a reciprocating motion from the internal combustion engine to the crank pins 5. Also, the bearing device 1 further includes, as sliding bearings that support a crankshaft, a main bearing 4 that rotatably supports the journal portions 6 and a conrod bearing 3 that rotatably supports the cranks pin 5.

Note that although the crankshaft includes a plurality of journal portions 6 and a plurality of crank pins 5, one journal portion 6 and one crank pin 5 will be illustrated and described herein for convenience of explanation. In a positional relationship in a paper surface depth direction in FIG. 1, the journal portion 6 corresponds to the further side while the crank pin 5 corresponds to the closer side shown in the paper surface.

The journal portion 6 is pivotally supported at a cylinder block lower portion 82 of the internal combustion engine via the main bearing 4 constituted by a pair of half bearings 41 and 42. The half bearing 41 on the upper side in FIG. 1 includes an oil groove 41a formed over the entire length of an inner circumferential surface. Also, the journal portion 6 includes a lubricant path 6a penetrating in a diameter direction, and if the journal portion 6 rotates in the direction of the arrow X, inlet openings 6c at both ends of the lubricant path 6a alternately communicate with the oil groove 41a in the main bearing 4.

The crank pin 5 is pivotally supported at a large end portion housing 21 (rod-side large end portion housing 22 and a cap-side large end portion housing 23) of the conrod 2 via the conrod bearing 3 constituted by a pair of half bearings 31 and 32.

As described above, a lubricant ejected by an oil pump to the main bearing 4 passes through a through-hole formed in the wall of the main bearing 4 from an oil gallery formed in a cylinder block wall and is fed to the inside of the oil groove 41a formed along the inner circumferential surface of the main bearing 4.

Moreover, a first lubricant path 6a is formed to penetrate in the diameter direction of the journal portion 6 such that an inlet opening 6c of the first lubricant path 6a can communicate with the lubricant groove 41a, a second lubricant path 5a branched from the first lubricant path 6a of the journal portion 6 and passing through a crank arm portion (not illustrated) is formed, and the second lubricant path 5a communicates with a third lubricant path 5b formed to penetrate in the diameter direction of the crank pin 5.

In this manner, the lubricant is supplied from an ejection port 5c at an end portion of the third lubricant path 5b to a clearance formed between the crank pin 5 and the conrod bearing 3 through the first lubricant path 6a, the second lubricant path 5a, and the third lubricant path 5b.

In general, local and strong collision (contact) of parts near end portions in an axial line direction of sliding surfaces of the half bearings 41 and 42 constituting the main bearing 4 and the half bearings 31 and 32 constituting the conrod bearing 3 due to deflection or whirling occurring in the crankshaft is likely to occur during an operation of the internal combustion engine. The half bearing in the related art in which crowning constituted by an inclined surface is formed at one of or both end portions of the sliding surface in the axial line direction has a problem that a high temperature is likely to be achieved due to direct contact between the part near the end portion of the sliding surface in the axial line direction and the crankshaft and seizure is likely to occur in the sliding surface.

The present invention is adapted to address such a problem in the related art.

Hereinafter, an example in which the half bearing according to the present invention is applied to the conrod bearing 3 will be illustrated and described. However, the present invention is not limited to the conrod bearing 3 and can also be applied to the main bearing 4. Although both the half bearings in the pair constituting the conrod bearing 3 or the main bearing 4 can be the half bearings according to the present invention, one of them may be the half bearing according to the present invention while the other one may be the half bearing in the related art that does not include the inclined surface portion in the sliding surface.

Figure 2:
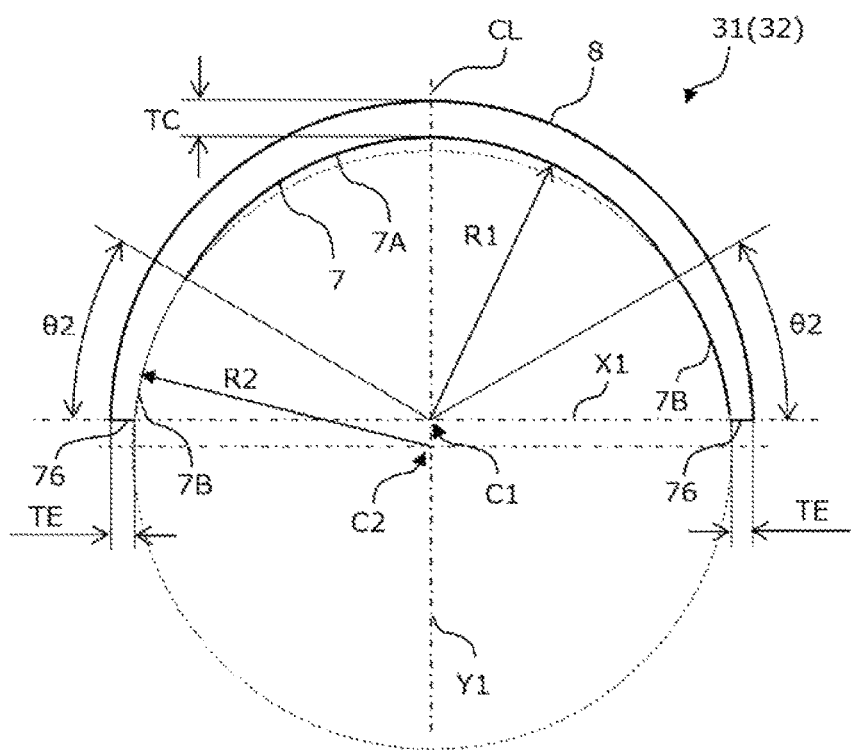
FIG. 2 is a diagram of a half bearing according to a first specific example of the present invention when seen in an axial line direction of the bearing.

FIG. 2 illustrates a first specific example of the half bearing (conrod bearing 3) according to the present invention. The conrod bearing 3 is formed by causing end surfaces 76 of the pair of half bearings 31 and 32 in the circumferential direction to abut on each other and combining the half bearings 31 and 32 into a cylindrical shape as a whole. The surface forming the inner circumferential surface of the cylindrical shape is a sliding surface 7, and the surface forming the outer circumferential surface is a back surface 8.

The sliding surface 7 of the half bearings 31 and 32 (when seen in the axial line direction) is formed by two types of arc surfaces with different curvatures. These are a first curved surface 7A located at a circumferential-direction center CL of the half bearing 31 or 32 and second curved surfaces 7B that are continuous from both circumferential-direction end portions of the first curved surface 7A.

In FIG. 2, the arc surface center of the first curved surface 7A is indicated as C1, and the arc surface center of the second curved surfaces 7B is indicated as C2. In FIG. 2, an imaginary straight line (X1) passing through both circumferential-direction end surfaces 76 and 76 of the half bearings 31 and 32 is drawn, and an imaginary straight line Y1 that equally divides the lengths of the half bearings 31 and 32 in the circumferential direction into two parts is drawn. The intersecting point between the imaginary straight lines X1 and Y1 is the axial line positions of the half bearings 31 and 32 and is also the arc surface center C1 of the first curved surface 7A. The first curved surface 7A is an arc surface with a radius R1 around C1. The arc surface center C2 of the second curved surfaces 7B is located on the imaginary straight line Y1 and is located at a position deviating outside the half bearings 31 and 32 relative to the arc surface center C1 of the first curved surface 7A. The second curved surfaces 7B are arc surfaces with a radius R2 around C2. The radius R2 is larger than the radius R1.

Also, a formation range of the second curved surfaces 7B is a range at a circumferential angle θ2 of 20° at a minimum and 50° at a maximum from both the circumferential-direction end surfaces 76 and 76 of the half bearings 31 and 32 toward the side of the circumferential-direction center CL.

The half bearings 31 and 32 formed to have the aforementioned shape properties have such a shape that the wall thickness of plane portions 71 in the regions corresponding to the second curved surfaces 7B successively decreases toward both the circumferential-direction end surfaces 76 and 76 relative to a wall thickness TC of the plane portion 71 (which will be described later) in the region corresponding to the first curved surface 7A and a minimum wall thickness TE is achieved at the positions of the end surfaces 76 and 76.

Note that the wall thickness of the plane portion 71 (which will be described later) in the first curved surface 7A of the half bearings 31 and 32 is constant in the circumferential direction. However, the wall thickness of the plane portion 71 in the first curved surface 7A may be a maximum thickness at the circumferential-direction center portion CL and successively decrease toward the sides of both the end surfaces 76 in the circumferential direction. Also, a difference "TC—TE" between the wall thickness TC of the plane portion 71 in the first curved surface 7A at the circumferential-direction center portion CL of the half bearings 31 and 32 and the wall thickness TE of the plane portion 71 in the second curved surfaces 7B at the end portions in the circumferential direction is preferably 5 μm to 50 μm. Also, the first curved surface 7A and/or the second curved surfaces 7B may be elliptical arc surfaces.

Figure 3A:
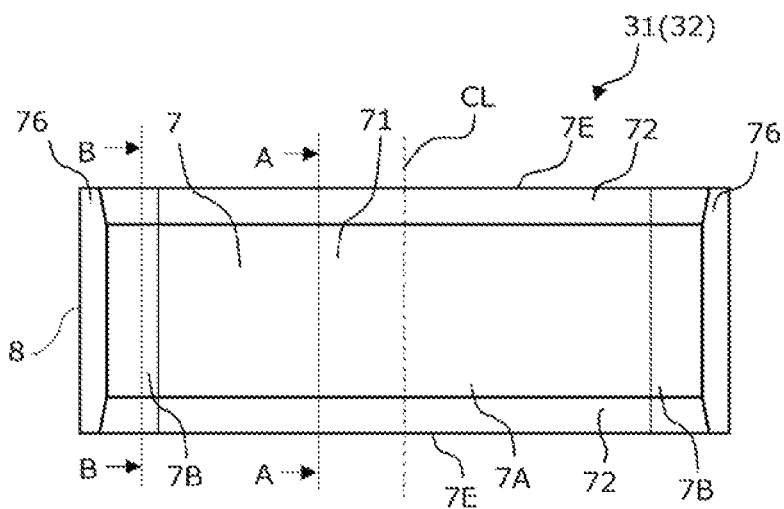
FIG. 3A is a plan view of the half bearing illustrated in FIG. 2 when seen from a sliding surface side.
Figure 3B:
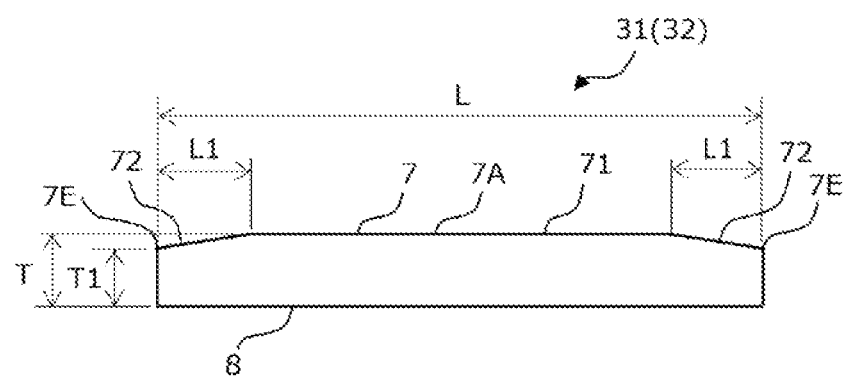
FIG. 3B is a sectional view along A-A in FIG. 3.
Figure 3C:
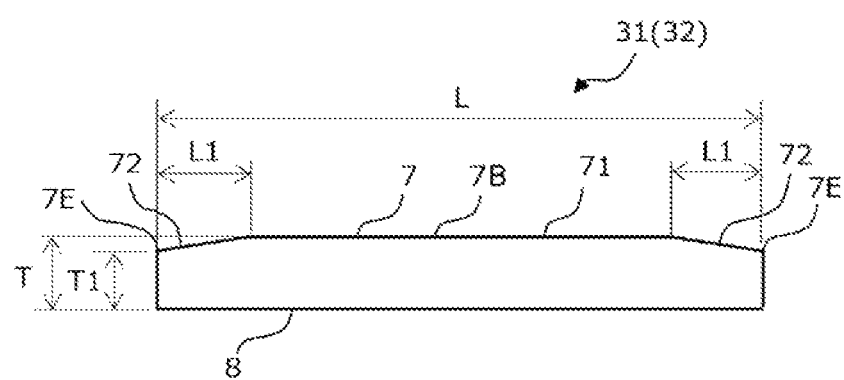
FIG. 3C is a sectional view along B-B in FIG. 3.

FIG. 3A illustrates an example of the half bearings 31 and 32 when seen from the sliding surface side. FIG. 3B illustrates a section along the portion A-A in FIG. 3A (a section at the first curved surface 7A), and FIG. 3C illustrates a section along B-B in FIG. 3A (a section at the second curved surfaces 7B). The sliding surface 7 (the first curved surface 7A and the second curved surfaces 7B) of the half bearings 31 and 32 includes a "plane portion" 71 that is parallel to the axial line direction of the half bearings 31 and 32 and an "inclined surface portion" 72 that is adjacent to the plane portion 71. The plane portion 71 is located at a center portion of the half bearings 31 and 32 in the axial line direction, and the inclined surface portion 72 is located at both end portions of the sliding surface 7 in the axial line direction. The inclined surface portion 72 is displaced from the plane portion 71 toward the end portion of the sliding surface 7 in the axial line direction such that the sliding surface 7 successively comes close to the back surface 8. In this example, the inclined surface portion 72 is present over the entire length of the sliding surface 7 in the circumferential direction. The width of each of the inclined surface portions 72 and 72 (the length of the half bearings in the axial line direction) is constant in the circumferential direction of the half bearings 31 and 32. Although the inclined surface portions 72 and 72 are preferably formed symmetrically with respect to the center of the sliding surface 7 in the width direction, the inclined surface portions 72 and 72 may be formed asymmetrically. Also, the inclined surface portion 72 may be formed at only one of the end portions of the sliding surface 7 in the axial line direction.

A plurality of first circumferential-direction grooves 73 (not illustrated in FIGS. 3A and 3B) are formed to be adjacent to each other in the first curved surface 7A of the half bearings 31 and 32. The plurality of first circumferential-direction grooves 73 extend to be parallel to the circumferential direction of the half bearings 31 and 32 and are formed over the entire length of the first curved surface 7A in the circumferential direction. The first circumferential-direction grooves 73 are disposed to be aligned in the axial line direction of the half bearings 31 and 32 and are formed over the entire width of the first curved surface 7A. Note that the first circumferential-direction grooves 73 are allowed to be slightly inclined (1° at a maximum) relative to the circumferential direction of the half bearings 31 and 32.

Figure 4:
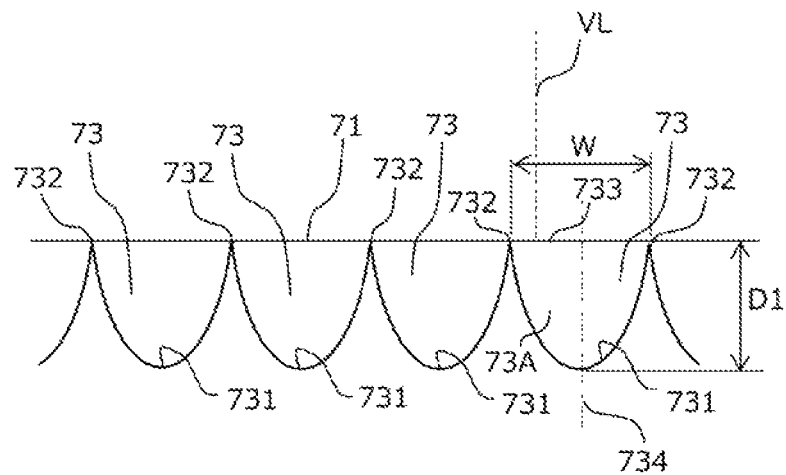
FIG. 4 is a sectional view of a first circumferential-direction groove in a plane portion of a first curved surface of the half bearing illustrated in FIG. 2.
Figure 5A:
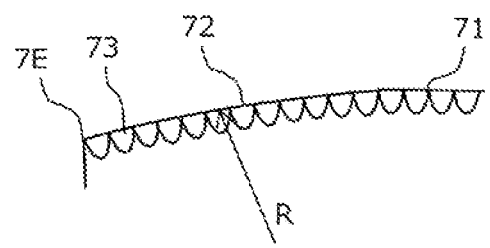
FIG. 5A is a sectional view of the first circumferential-direction groove in an inclined surface portion of the first curved surface of the half bearing illustrated in FIG. 2.
Figure 5B:
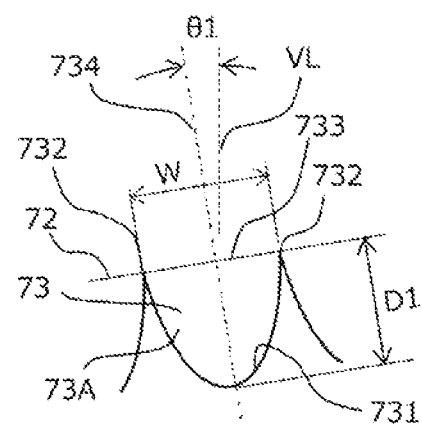
FIG. 5B is a sectional enlarged view of the first circumferential-direction groove in the inclined surface portion of the first curved surface of the half bearing illustrated in FIG. 2.

FIG. 4 illustrates a sectional view of the first circumferential-direction grooves 73 in the plane portion 71 of the first curved surface 7A of the half bearings 31 and 32 illustrated in FIG. 2. FIG. 5A illustrates a sectional view of the first circumferential-direction grooves 73 in the inclined surface portion 72 of the first curved surface 7A of the half bearings 31 and 32 illustrated in FIG. 2. FIG. 5B illustrates a sectional view of the first circumferential-direction grooves 73 illustrated in FIG. 5A in a further enlarged manner. These sectional views illustrate sections of the half bearings 31 and 32 in the axial line direction. Note that hereinafter, the first circumferential-direction grooves 73 are depicted in an exaggerated manner in each drawing for easy understanding.

The first circumferential-direction grooves 73 include curved recessed surfaces 731 when seen in the section of the half bearings 31 and 32 in the axial line direction. Apex portions 732 are formed between the recessed surfaces 731 of the adjacent first circumferential-direction grooves 73. A line connecting the apex portions 732 represents a sliding surface. In a microscopical view, no flat region is present in the first curved surface 7A.

A groove width W of the first circumferential-direction grooves is defined as a length of imaginary straight lines 733 linearly connecting the apex portions 732 on both sides of the first circumferential-direction grooves 73. Groove center lines 734 are defined as lines that pass through the center positions of the lengths of the imaginary straight lines 733 and extend in the normal direction with respect to the imaginary straight lines 733. A groove depth D1 of the first circumferential-direction grooves 73 is defined as a length to a position at which the recessed surfaces 731 are most separated from the imaginary straight lines 733 in the normal direction with respect to the imaginary straight lines 733. The positions of the maximum groove depth D1 of the first circumferential-direction grooves 73 are located on the groove center lines 734.

Areas surrounded by the imaginary straight lines 733 and the recessed surfaces 731 are defined as groove sectional areas 73A. Each of the first circumferential-direction grooves 73 has the same groove width W, the same groove depth D1, and the same groove sectional area 73A. Moreover, the groove width W, the groove depth D1, and the groove sectional area 73A of the first circumferential-direction grooves 73 are the same at any position in the circumferential direction.

Also, the shape of the recessed surface 731 of each first circumferential-direction groove 73 is formed to be symmetric with respect to the groove center line 734. Two groove sectional areas obtained by dividing the groove sectional area 73A of each first circumferential-direction groove 73 by the groove center line 734 are the same as each other.

As illustrated in FIG. 5A, the inclined surface portion 72 of the first curved surface 7A is a curve slightly projecting toward the inside in the radial direction of the half bearings 31 and 32.

An angle formed by a vertical line VL extending in the vertical direction from the plane portion 71 of the first curved surface 7A of the sliding surface 7 toward the axial line of the half bearings 31 and 32 and the groove center lines 734 of the first circumferential-direction grooves 73 is defined as a groove inclination angle $\theta 1$. The groove inclination angle $\theta 1$ of each first circumferential-direction groove 73 in the plane portion 71 of the first curved surface 7A of the sliding surface 7 is 0°. Note that the groove center line 734 of each first circumferential-direction groove 73 in the plane portion 71 of the first curved surface 7A of the sliding surface 7 is allowed to be slightly inclined ($1 \times 10^{-2\circ}$ at a maximum) with respect to the vertical line VL due to an error at the time of working of the first circumferential-direction groove 73.

The groove center lines 734 in the inclined surface portion 72 of the first curved surface 7A of the sliding surface 7 are inclined with respect to the vertical line VL toward the end portion of the sliding surface 7 in the axial line direction, the groove inclination angle $\theta 1$ of the first circumferential-direction groove 73 that is the closest to the plane portion 71 is a minimum angle, and the groove inclination angle $\theta 1$ successively increases toward the end portion of the sliding surface 7 in the axial line direction.

A plurality of second circumferential-direction grooves 74 (not illustrated in FIGS. 3A and 3B) are formed to be adjacent to each other in the second curved surfaces 7B of the half bearings 31 and 32. The plurality of second circumferential-direction grooves 74 extend to be parallel to the circumferential direction of the half bearings 31 and 32 and are formed over the entire lengths of the second curved surfaces 7B in the circumferential direction. The second circumferential-direction grooves 74 are disposed to be aligned in the axial line direction of the half bearings 31 and 32 and are formed over the entire widths of the second curved surface 7B. Note that the second circumferential-direction grooves 74 are allowed to be slightly inclined (1° at a maximum) with respect to the circumferential direction of the half bearings 31 and 32.

Figure 6:
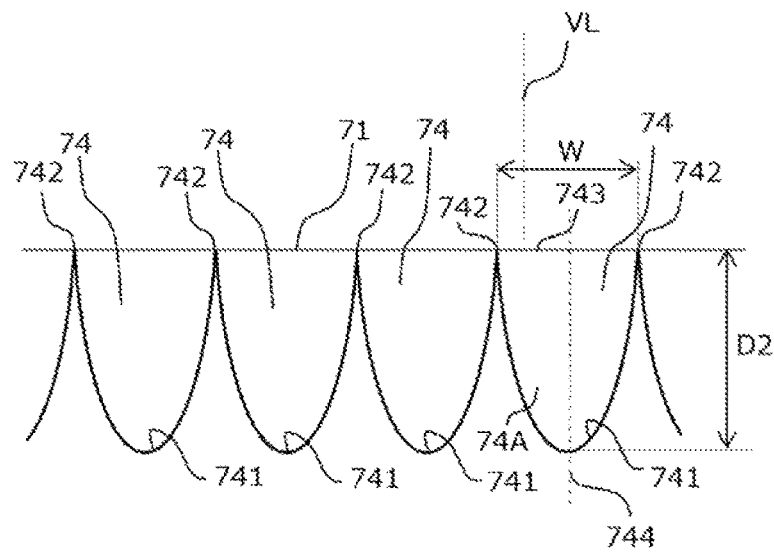
FIG. 6 is a sectional view of a second circumferential-direction groove in a plane portion of a second curved surface of the half bearing illustrated in FIG. 2.
Figure 7A:
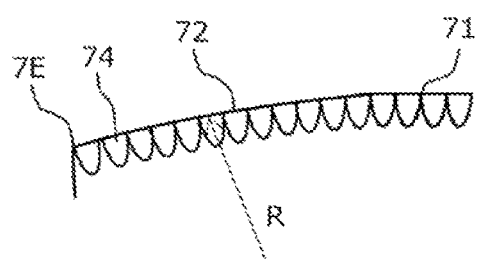
FIG. 7A is a sectional view of the second circumferential-direction groove in an inclined surface portion of the second curved surface of the half bearing illustrated in FIG. 2.
Figure 7B:
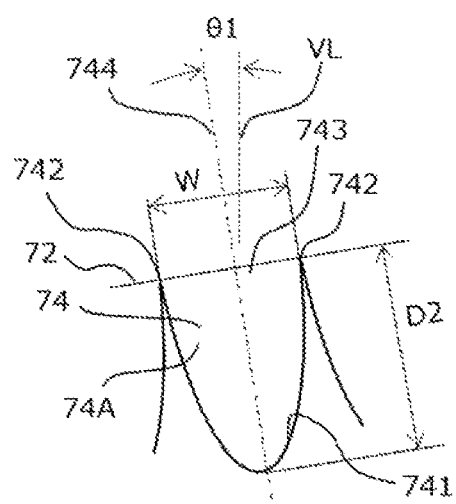
FIG. 7B is a sectional enlarged view of the second circumferential-direction groove in the inclined surface portion of the second curved surface of the half bearing illustrated in FIG. 2.

FIG. 6 illustrates a sectional view of the second circumferential-direction grooves 74 in the plane portion 71 of the second curved surfaces 7B of the half bearings 31 and 32 illustrated in FIG. 2. FIG. 7A illustrates a sectional view of the second circumferential-direction grooves 74 in the inclined surface portion 72 of the second curved surfaces 7B of the half bearings 31 and 32 illustrated in FIG. 2. FIG. 7B illustrates a sectional view of the second circumferential-direction grooves 74 illustrated in FIG. 7A in a further enlarged manner. These sectional views illustrate sections of the half bearings 31 and 32 in the axial line direction. Note that hereinafter, the second circumferential-direction grooves 74 are depicted in an exaggerated manner in each drawing for easy understanding.

The second circumferential-direction grooves 74 include curved recessed surfaces 741 when seen in the section of the half bearings 31 and 32 in the axial line direction. Apex portions 742 are formed between the recessed surfaces 741 of the adjacent second circumferential-direction grooves 74. A line connecting the apex portions 742 represents the sliding surface. In a microscopical view, no flat region is present in the second curved surfaces 7B.

A groove width W of the second circumferential-direction grooves is defined as a length of an imaginary straight line 743 linearly connecting the apex portions 742 on both sides of each second circumferential-direction groove 74. The groove center line 744 is defined as a line that passes through the center position of the length of each imaginary straight line 743 and extends in the normal direction with respect to the imaginary straight line 743. A groove depth D2 of the second circumferential-direction grooves 74 is defined as a length to a position where the recessed surface 741 are the most separated from the imaginary straight lines 743 in the normal direction with respect to the imaginary straight lines 743. The positions of the maximum groove depth D2 of the second circumferential-direction grooves 74 are located on the groove center lines 744.

Areas surrounded by the imaginary straight lines 743 and the recessed surfaces 741 are defined as a groove sectional area 74A. Each second circumferential-direction groove 74 has the same groove width W, the groove depth D2, and the groove sectional area 74A. Moreover, the groove width W, the groove depth D2, and the groove sectional area 74A of the second circumferential-direction grooves 74 are the same at any position in the circumferential direction. Also, although the groove width W of the second circumferential-direction grooves 74 is the same as the groove width W of the first circumferential-direction grooves 73, the groove depth D2 and the groove sectional area 74A of the second circumferential-direction grooves 74 are larger than the groove depth D1 and the groove sectional area 73A of the first circumferential-direction grooves 73.

Also, the shape of the recessed surface 741 of each second circumferential-direction groove 74 is formed to be symmetric with respect to the groove center line 744. Two groove sectional areas obtained by dividing the groove sectional area 74A of each second circumferential-direction groove 74 by the groove center line 744 are the same as each other.

As illustrated in FIG. 7A, the inclined surface portion 72 of the second curved surfaces 7B is a curve slightly projecting toward the inside in the radial direction of the half bearings 31 and 32.

An angle formed by a vertical line VL extending in the vertical direction from the plane portion 71 in the second curved surfaces 7B of the sliding surface 7 toward the axial line of the half bearings 31 and 32 and the groove center lines 744 of the second circumferential-direction grooves 74 is defined as a groove inclination angle θ1. The groove inclination angle θ1 of each second circumferential-direction groove 74 in the plane portion 71 of the second curved surfaces 7B of the sliding surface 7 is 0°. Note that the groove center line 734 of each second circumferential-direction groove 74 in the plane portion 71 of the second curved surfaces 7B of the sliding surface 7 is allowed to be slightly inclined ($1\times10^{-2\circ}$ at a maximum) with respect to the vertical line VL due to an error at the time of working the second circumferential-direction grooves 74.

The groove center lines 744 in the inclined surface portion 72 of the second curved surfaces 7B of the sliding surface 7 are inclined with respect to the vertical line VL toward the end portion of the sliding surface 7 in the axial line direction, the groove inclination angle θ1 of the second circumferential-direction groove 74 that is the closest to the plane portion 71 is a minimum angle, and the groove inclination angle θ1 successively increases toward the end portion of the sliding surface 7 in the axial line direction.

The conrod bearing 3 in the present embodiment is formed by causing end surfaces 76 of the pair of half bearings 31 and 32 in the circumferential direction to abut on each other and combining the half bearings 31 and 32 into a cylindrical shape as a whole. The half bearings 31 and 32 can have sliding layers of a Cu bearing alloy or an Al bearing alloy. Alternatively, it is possible to have sliding layers of a Cu bearing alloy or an Al bearing alloy on back metal layers made of an Fe alloy. Also, sliding layers including a surface portion made of a Cu bearing alloy or an Al bearing alloy and any one kind selected from soft Bi, Sn, and Pb or made of an alloy containing such metal as a main constituent and a surface portion made of a resin composition containing a synthetic resin as a main constituent and disposed on the sliding surface side beyond the bearing alloy may be included.

Next, actions of the half bearings 31 and 32 according to the present invention will be described with reference to FIGS. 8A and 8B. During a high-speed operation of the internal combustion engine, local and strong collision (contact) of a part (inclined surface portion 72) near the end portions in the axial line direction of the sliding surfaces 7 of the half bearings 31 and 32 constituting the conrod bearing 3 against the crankshaft is likely to occur due to deflection or whirling occurring in the crankshaft. If deflection or whirling occurs in the crankshaft 5, then the inclined surface portions 72 of the sliding surfaces 7 of the half bearings 31 and 32 and the surface of the crankshaft 5 repeat a separating operation and an approaching operation.

Figure 8A:
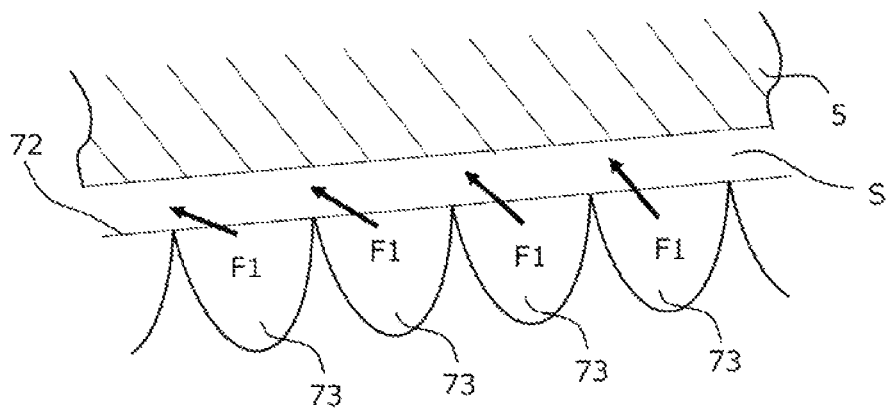
FIG. 8A is a sectional view for explaining actions of the present invention.
Figure 8B:
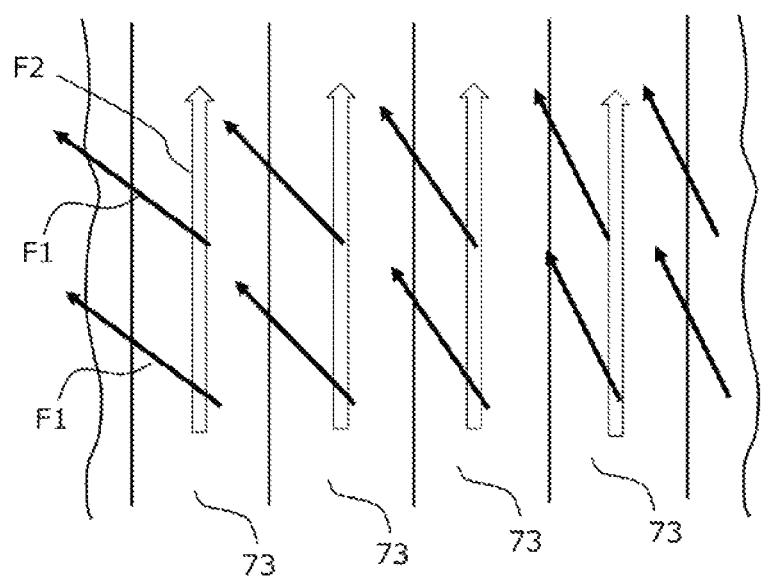
FIG. 8B is a plan view for explaining actions of the present invention.

A state immediately before the inclined surface portion 72 in the first curved surface 7A of the sliding surface 7 of the half bearings 31 and 32 and the surface of the crankshaft 5 are brought into direct contact with each other after the inclined surface portion 72 in the first curved surface 7A and the surface of the crankshaft 5 operate to relatively approach each other from a separated state is illustrated in FIGS. 8A and 8B. FIG. 8A illustrates a section of the inclined surface portion 72 in the first curved surface 7A. FIG. 8B illustrates a view of the inclined surface portion 72 in the first curved surface 7A when seen from the bearing center side with the crankshaft 5 omitted.

When the surface of the crankshaft 5 comes close to the inclined surface portion 72, an oil flowing through a clearance S in the circumferential direction is compressed toward the inside (recessed surfaces 731) of the plurality of first circumferential-direction grooves 73 in the inclined surface portion 72 by the surface of the crankshaft 5. The oil inside each first circumferential-direction groove has an increasing pressure by being pressed by the oil compressed and flowing thereinto later, not only flows inside the first circumferential-direction groove in the circumferential direction but also flows into (flows backward toward) the clearance S between two surfaces, and thereby forms an oil flow F1. The groove center line 734 of each first circumferential-direction groove 73 in the inclined surface portion 72 is inclined toward the side of the end portion 7E of the sliding surface 7 (first curved surface 7A) in the axial line direction. Therefore, the oil flow F1 flowing out from the inside of the first circumferential-direction groove mainly flows toward the surface side of the crankshaft 5 with an inclination toward the side of the end portion 7E of the sliding surface 7 (first curved surface 7A) in the axial line direction. At this time, an oil flow F2 flowing in the circumferential direction in the clearance S is formed along with the surface of the rotating crankshaft 5 near the surface of the crankshaft 5 (FIG. 8B).

Due to collision of the oil flow F1 and the F2 crossing each other, the oil between the inclined surface portion 72 and the surface of the crankshaft 5 (inside the clearance S and the circumferential-direction grooves 73) is temporarily brought into a turbulence state. Since the heat of the inclined surface portion 72 in the sliding surface 7 (first curved surface 7A) caused through the contact with the crankshaft 5 is efficiently transmitted to the oil in the turbulence state, a temperature rise that may lead to cooling of the inclined surface portion 72 and then seizure is curbed.

Also, in a case in which the oil that has been temporarily brought into a turbulence state and has an increasing temperature through cooling of the inclined surface portion 72 remains in the clearance S between the two surfaces without being discharged to the outside of the bearings, a difference in temperature from the inclined surface portion 72 is reduced even if the turbulence state is achieved again due to the above principle, and the cooling effect is thus degraded.

Each first circumferential-direction groove 73 in the inclined surface portion 72 of the sliding surface 7 (first curved surface 7A) is adapted such that the groove inclination angle θ1 of the first circumferential-direction groove 73 that is the closest to the plane portion 71 is the minimum angle and the groove inclination angle θ1 successively increases toward the end portion 7E of the sliding surface 7 (first curved surface 7A) in the axial line direction.

Figure 8C:
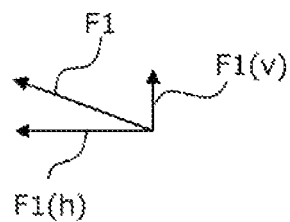
FIG. 8C is a component exploded view of an oil flow F1 on an end portion side.
Figure 8D:
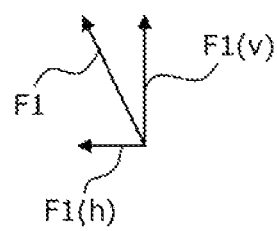
FIG. 8D is a component exploded view of the oil flow F1 on a plane portion side.

FIG. 8C illustrates the oil flow F1 in the first circumferential-direction groove disposed near the end portion 7E in the axial line direction in the inclined surface portion 72 of the first curved surface 7A of the sliding surface 7, and the oil flow F1 is decomposed into a component F1(v) directed to the surface side of the crankshaft 5 and a component F1(h) directed to the side of the end portion 7E in the axial line direction. FIG. 8D illustrates the oil flow F1 in the first circumferential-direction groove disposed near the plane portion 71 in the inclined surface portion 72 of the first curved surface 7A of the sliding surface 7, and the oil flow F1 is decomposed into a component F1(v) directed to the surface side of the crankshaft 5 and a component F1(h) directed to the side of the end portion 7E in the axial line direction. Note that in FIGS. 8C and 8D, the upper side in the drawings corresponds to the surface side of the crankshaft 5 and the left side in the drawings corresponds to the side of the end portion 7E in the axial line direction.

The component F1(h) increases in the first circumferential-direction groove portions that are closer to the end portion 7E in the axial line direction. Therefore, the oil at a temperature that has been raised in the clearance S is likely to flow toward the end portion 7E of the sliding surface 7 (first curved surface 7A) in the axial line direction. At the same time, F1(v) increases in the first circumferential-direction groove portions that are closer to the plane portion 71. Therefore, the oil at a temperature that has been raised in the clearance S serves as a resistance of an oil flow toward the plane portion 71 inside the clearance S. Therefore, the oil at a temperature that has been raised in the clearance S is likely to be discharged from the end portion 7E of the sliding surface 7 (first curved surface 7A) in the axial line direction to the outside of the half bearings 31 and 32.

In a case in which the groove center line 734 of each first circumferential-direction groove 73 in the inclined surface portion 72 is inclined toward the center portion side of the sliding surface 7 in the axial line direction unlike the configuration in the present embodiment, the oil flow F1 flows toward the center portion side of the sliding surface 7 in the axial line direction. Therefore, the oil at an increasing temperature is less likely to be discharged to the outside of the half bearings 31 and 32. Also, in a case in which the groove inclination angle θ1 of each circumferential-direction groove 73 in the inclined surface portion 72 is set to be constant unlike the configuration in the present embodiment, the component F1(v) of the oil flow F1 in each circumferential-direction groove 73 becomes constant. Therefore, the oil at the increasing temperature may flow toward the plane portion 71 inside the clearance S and is less likely to be discharged to the outside of the half bearings 31 and 32.

Figure 9:
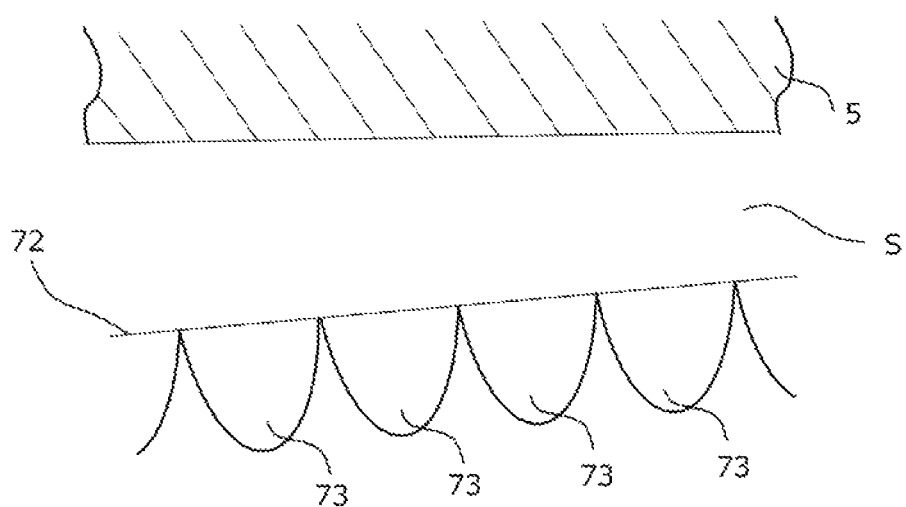
FIG. 9 is a sectional view for explaining actions at the time of a regular operation.

FIG. 9 illustrates a view of FIG. 7A during a regular operation of the internal combustion engine. FIG. 9 illustrates a section of the inclined surface portion 72 of the sliding surface 7 (first curved surface 7A). In general, a pressure loss occurs, and a mechanical loss of the internal combustion engine occurs, when the oil in a laminar flow state is brought into a turbulence state. As illustrated in FIG. 9, the amount of deflection or whirling in the crankshaft is small during a regular operation, and a sufficient clearance S is formed between the inclined surface portion 72 of the sliding surface 7 (first curved surface 7A) of the half bearings 31 and 32 and the surface of the crankshaft 5. Therefore, the amount of oil compressed and flow toward the inside of each circumferential-direction groove 73 in the inclined surface portion 72 by the surface of the crankshaft 5 is small, the pressure of the oil inside each circumferential-direction groove 73 does not become high, and the oil flow F1 is thus not formed or becomes weak. Therefore, the oil that is present in the clearance S flows in the laminar flow state in the circumferential direction and thus does not cause a pressure loss and a mechanical loss of the internal combustion engine.

Note that although the actions of the first circumferential-direction grooves 73 in the inclined surface portion 72 of the first curved surface 7A of the sliding surface 7 of the half bearings 31 and 32 have been described here, effects that are similar to those described above can also be obtained from the second circumferential-direction grooves 74 in the second curved surfaces 7B. In other words, if deflection or whirling occurs in the crankshaft during a high-speed operation of the internal combustion engine, the inclined surface portion 72 and the surface of the crankshaft 5 repeat the separating operation and the approaching operation even in the second curved surfaces 7B of the sliding surface 7 of the half bearings 31 and 32. Also, a sufficient clearance S is formed between the inclined surface portion 72 of the second curved surfaces 7B and the surface of the crankshaft 5 during the regular operation of the internal combustion engine.

The groove depth D1 of the first circumferential-direction grooves 73 is preferably set to 1.5 μm to 5 μm. The groove width W of the first circumferential-direction grooves 73 is preferably set to 0.05 to 0.25 mm. In a case in which the groove depth D1 of the first circumferential-direction grooves 73 exceeds 5 μm or the groove width W exceeds 0.25 mm, the oil flow F1 caused by the first circumferential-direction grooves 73 is weakened. In a case in which the groove depth D1 of the first circumferential-direction grooves 73 is less than 1.5 μm or the groove width W is less than 0.05 mm, the amount of the oil flow F1 flowing out from each first circumferential-direction groove 73 to the clearance S decreases. Therefore, the inclined surface portion 72 of the first curved surface is not sufficiently cooled.

The groove depth D2 of the second circumferential-direction grooves 74 is preferably set to be two to five times as large (D2=D1×2 to 5) as the groove depth D1 of the first circumferential-direction grooves 73. The groove width W of the second circumferential-direction grooves 74 is preferably set to 0.05 to 0.25 mm. The groove sectional area 74A of the second circumferential-direction grooves 74 becomes larger than the groove sectional area 73A of the first circumferential-direction grooves 73 by setting the groove depth D2 of the second circumferential-direction grooves 74 to be two to five times as large as the groove depth D1 of the first circumferential-direction grooves 73.

Although the second curved surface 7B has a larger clearance S from the surface of the crankshaft 5 than the clearance S of the first curved surface 7A, it is possible to reduce the amount of oil leaking from an end portion of a clearance S in the axial line direction to the outside of the half bearings 31 and 32 since the oil that is present in the clearance S is guided by the second circumferential-direction grooves 74 and is likely to flow in the circumferential direction during the regular operation of the internal combustion engine.

Also, although the groove depth D2 and the groove sectional area 74A of the second circumferential-direction grooves 74 are larger than the groove depth D1 and the groove sectional area 74A of the first circumferential-direction grooves 73, the clearance S of the second curved surfaces 7B is larger, and the amount of the oil that is present in the clearance S is larger. Therefore, since the amount of the oil compressed toward the inside (recessed surfaces 741) of the plurality of second circumferential-direction grooves 74 in the inclined surface portion 72 becomes larger when the inclined surface portion 72 of the second curved surfaces 7B of the sliding surface 7 of the half bearings 31 and 32 and the surface of the crankshaft 5 perform the operation of approaching each other from the separated state during a high-speed operation of the internal combustion engine, a sufficient oil flow F1 is also formed in the second circumferential-direction grooves 74.

The width (the length of the half bearing in the axial line direction) L1 of the inclined surface portion 72 is preferably set to be a length corresponding to 2 to 10% of the width L of the sliding surface 7. If the width L1 of the inclined surface portion 72 is less than 2% of the width L of the sliding surface 7, the region where the oil is brought into a turbulence state is excessively small, and the inclined surface portion may not sufficiently be cooled. If the width L1 exceeds 10%, the region of the plane portion 71 in the sliding surface 7 that supports the crankshaft 5 during a regular operation of the internal combustion engine decreases, which is not preferable. Note that it is preferable that ten or more first or second circumferential-direction grooves 73 or 74 are formed, and it is more preferable that fifteen or more first or second circumferential-direction grooves 73 or 74 are formed, in each inclined surface portion 72.

The wall thickness T1 of the inclined surface portion 72 at the end portion 7E of the sliding surface 7 (the first curved surface 7A and the second curved surface 7B) in the axial line direction is preferably smaller than the wall thickness T of the plane portion 71 by 2 to 10 μm. The difference (T−T1) of the wall thicknesses corresponds to the depth of the inclined surface portion. If the depth of the inclined surface portion is less than 2 μm, only the part near the end portion E of the inclined surface portion 72 of the sliding surface 7 in the axial line direction of the sliding surface 7 is brought into a local and strong contact with the crankshaft 5, and the temperature of the inclined surface portion 72 may be raised when the amount of deflection or whirling of the crankshaft increases during a high-speed operation of the internal combustion engine. If the depth of the inclined surface portion exceeds 10 μm, only the part of the inclined surface portion 72 of the sliding surface 7 adjacent to the plane portion 71 of the sliding surface 7 is brought into a local and strong contact with the crankshaft 5, and the temperature of the inclined surface portion 72 may be raised. Note that the wall thickness means a length in the radial direction of the half bearings 31 and 32 between the sliding surface (the line connecting the apex portions 732 of the circumferential-direction grooves 73) and the back surface 8 of the half bearings 31 and 32.

The groove inclination angle θ1 of the first and second circumferential-direction grooves 73 and 74 that are closest to the end portion of the sliding surface 7 (the first curved surface 7A and the second curved surfaces 7B) of the inclined surface portion 72 in the axial line direction is preferably set to $3\times10^{-2\circ}$ to $30\times10^{-2\circ}$. In a case in which the groove inclination angle θ1 of the first and second circumferential-direction grooves 73 and 74 that are the closest to the end portion 7E of the sliding surface 7 of the inclined surface portion 72 in the axial line direction is less than $3\times10^{-2\circ}$, an oil flow F1 from each of the first and second circumferential-direction grooves 73 and 74 of the inclined surface portion 72 toward the clearance S may not sufficiently be formed. Also, in a case in which the groove inclination angle θ1 of the first and second circumferential-direction grooves 73 and 74 that are the closest to the end portion 7E of the sliding surface 7 of the inclined surface portion 72 in the axial line direction exceeds $30\times10^{-2\circ}$, the oil in the clearance S may become likely to be discharged to the outside of the half bearings 31 and 32 even during a regular operation of the internal combustion engine.

Each of the first circumferential-direction grooves 73 formed in the plane portion 71 and the inclined surface portion 72 of the first curved surface 7A has the same groove depth D1, the same groove width W, and the same groove sectional area 73A at any position of the first curved surface 7A in the circumferential direction. Each of the second circumferential-direction grooves 74 formed in the plane portion 71 and the inclined surface portion 72 of the second curved surface 7B has the same groove depth D2, the same groove width W, and the same groove sectional area 74A at any position of the second curved surface 7B in the circumferential direction. The pressure of the oil pressurized and flowing into each of the first or second circumferential-direction grooves 74 and 74 becomes substantially simultaneously equivalently high and the oil flow F1 flowing backward from each of the first or second circumferential-direction grooves toward the clearance S is substantially simultaneously formed when the surface of the crankshaft 5 comes close to the inclined surface portion 72 of the first curved surface 7A or the second curved surfaces 7B during a high-speed operation of the internal combustion engine, by each of the first circumferential-direction grooves 73 in the inclined surface portion 72 of the first curved surface 7A having the same groove depth D1, the same groove width W, and the same groove sectional area 73A and by each of the second circumferential-direction grooves 74 in the inclined surface portion 72 of the second curved surface 7B having the same groove depth D2, the same groove width W, and the same groove sectional area 74A. Therefore, the entire oil that is present in the clearance S between the inclined surface portion 72 and the surface of the crankshaft 5 is likely to be brought into a turbulence state at the same time.

In a case in which the groove depth D1, the groove width W, and the groove sectional area 73A of each first circumferential-direction groove 73 in the inclined surface portion 72 of the first curved surface 7A are not constant, and the groove depth D2, the groove width W, and the groove sectional area 74A of each second circumferential-direction groove 74 in the inclined surface portion 72 of the second curved surface 7B are not constant, unlike the present embodiment, the pressure of the oil pressurized and flowing into each of the first or second circumferential-direction grooves 73 and 74 when the surface of the crankshaft 5 comes close to the inclined surface portion 72 of the first curved surface 7A or the second curved surface 7B does not become the same pressure at the same time, and the oil flow F1 flowing backward from each of the first or second circumferential-direction grooves toward the clearance S is substantially not formed at the same time. Alternatively, in the first and second circumferential-direction grooves 73 and 74 with relatively large groove depth D1 and D2, groove width W, and groove sectional areas 73A and 74A of the first and second circumferential-direction grooves 73 and 74 from among the plurality of first and second circumferential-direction grooves 73 and 74, the pressure of the oil flowing into the first and second circumferential-direction grooves 73 and 74 is not raised, and the oil flow F1 is thus not formed (the oil flows in the circumferential direction inside the first and second circumferential-direction grooves 73 and 74). Therefore, the entire oil that is present in the clearance S is not brought into a sufficient turbulence state. The effect of cooling the inclined surface portion 72 thus becomes insufficient.

Figure 10A:
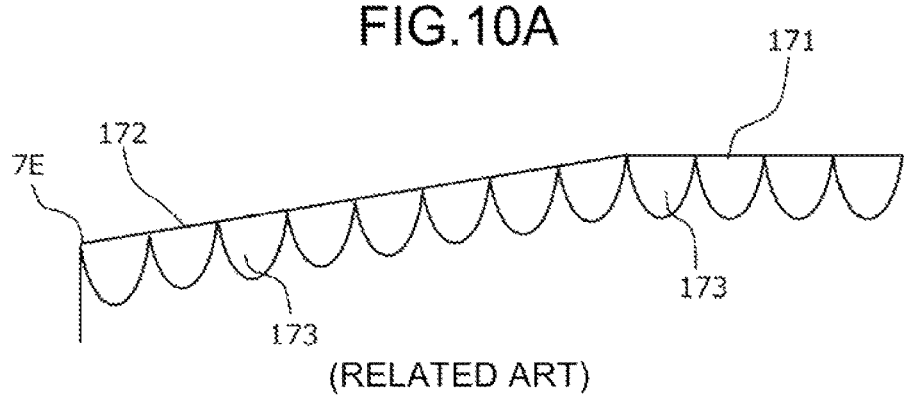
FIG. 10A is a sectional view of a sliding surface according to a comparative example.
Figure 10B:
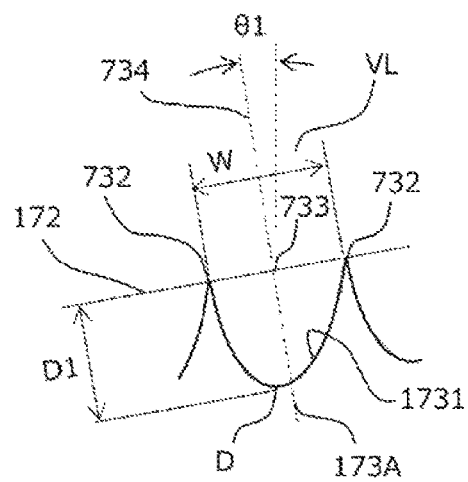
FIG. 10B is a sectional enlarged view of a circumferential-direction groove in an inclined surface portion according to the comparative example.
Figure 10C:
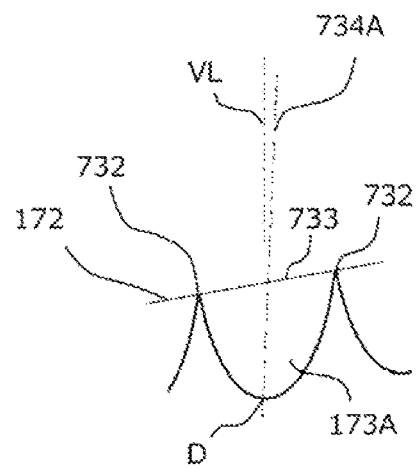
FIG. 10C is a sectional enlarged view of the circumferential-direction groove in the inclined surface portion according to the comparative example.

FIG. 10A illustrates a section of a sliding surface in the related art in which a plurality of circumferential-direction grooves 173 that are different from those in the present embodiment are formed in the inclined surface portion 172 of the sliding surface 17 according to International Publication No. WO 2010/038588. FIGS. 10B and 10C illustrate enlarged sections of a circumferential-direction groove 173 in the inclined surface portion 172 illustrated in FIG. 10A. The sliding surface is formed in accordance with the method described in Paragraphs 0023 to 0025 in International Publication No. WO 2010/038588. In other words, when an inner diameter surface of a half bearing material is worked (the circumferential-direction grooves 173 are formed) using a cylindrical drill spindle with a cutting cartridge that is driven by a rotation-type drive device, the sliding surface (the circumferential-direction grooves 173) is formed through a rotating operation of the drill spindle and a linear motion operation of the drill spindle in the axial line direction. The sliding surface (circumferential-direction grooves 173) is formed in the inclined surface portion 172 with a varying bearing wall thickness by causing the drill spindle to further operate in a direction that perpendicularly intersects the axial line direction.

The circumferential-direction grooves 173 in the plane portion 171 in the related art has the same configuration as that of the circumferential-direction grooves 73 in the plane portion 71 according to the present invention. Although each circumferential-direction groove 173 in the inclined surface portion 172 according to the related art has the same groove depth D1, the same groove width W, and the same groove sectional area 173A, but the groove depth D1, the groove width W, and the groove sectional area 173A are smaller than the groove depth D1, the groove width W, and the groove sectional area 173A of the circumferential-direction grooves 173 in the plane portion 171.

Also, the position D of the maximum groove depths of the circumferential direction grooves 173 in the inclined surface portion 172 are not located on the groove center lines 734 and are located on the end portion side of the sliding surface in the axial line direction beyond the groove center lines 734. Therefore, the shape of the recessed surface 1731 of each circumferential-direction groove 173 is formed to e asymmetric with respect to the groove center line 734. Therefore, two groove sectional areas obtained by dividing the groove sectional area 73A of each circumferential-direction groove 173 by the groove center line 734 are not the same as each other. Also, the groove inclination angle θ1 formed by the vertical line VL extending in the vertical direction from the plane portion 171 of the sliding surface 17 toward the axial line of the half bearings and the groove center lines 734 is the same for each of the circumferential-direction grooves 173 (FIG. 10B).

Here, a second groove center line 734A of each circumferential-direction groove 173 in the inclined surface portion 172 is defined (FIG. 10C). The second groove center line 734A is defined as a straight line that passes through the position D of the maximum groove depth and equally divides the groove sectional area 173A into two parts. The second groove center line 734A is slightly inclined toward the center portion side of the sliding surface in the axial line direction. Therefore, the configuration in which the plurality of circumferential-direction grooves 173 are formed in the inclined surface portion 172 of the sliding surface according to the related art cannot obtain the cooling action as in the present invention. Even if the cooling action can be obtained, the action of discharging the oil at an increasing temperature to the outside of the half bearings cannot be obtained.

Hereinafter, non-restrictive specific examples of other embodiments of the present invention will be described.

Second Specific Example

Figure 11:
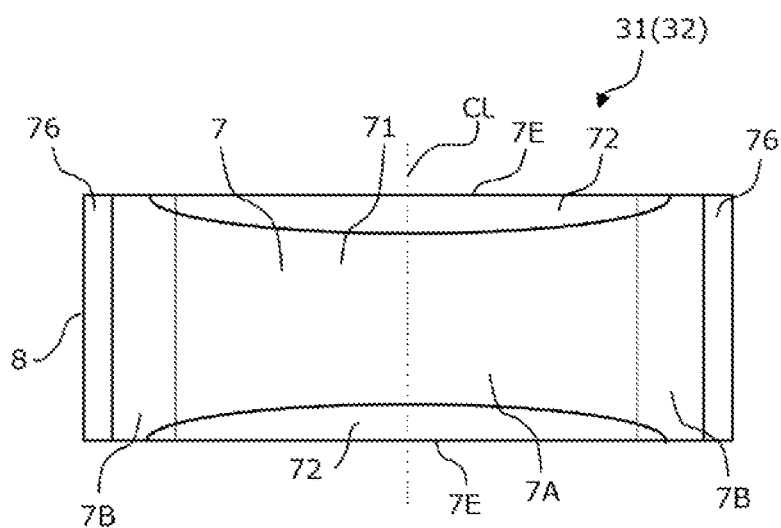
FIG. 11 is a plan view of a half bearing according to a second specific example of the present invention when seen from a sliding surface side.

FIG. 11 illustrates a plan view of the half bearings 31 and 32 according to a second specific example of the present invention when seen from the sliding surface side. The inclined surface portion 72 has a shorter length in the circumferential direction than the length of the sliding surface 7 in the circumferential direction and is formed to include a part of the length of the sliding surface 7 in the circumferential direction. FIG. 11 also provides illustration from which the first and second circumferential-direction grooves 73 and 74 are omitted. The other configurations are the same as the configurations of the half bearings 31 and 32 that have already been described above.

In the inclined surface portion 72, the width L1 of the inclined surface portion 72 is the maximum at the center of the length in the circumferential direction and successively decreases toward both end portions of the length in the circumferential direction. The inclined surface portion 72 has the maximum depth (the difference (T–T1) between the wall thickness T of the plane portion 71 and the wall thickness T1 of the inclined surface portion 72 at the end portion 7E of the sliding surface 7 (first curved surface 7A) in the axial line direction) at the center of the length in the circumferential direction, and the depth of the inclined surface portion 72 successively decreases toward both end portions of the length in the circumferential direction. The width L1 and the depth of the inclined surface portion 72 are preferably the dimensions described above at the center portion of the length of the inclined surface portion 72 in the circumferential direction.

Although the center of the length of the inclined surface portion 72 in the circumferential direction is located at the circumferential-direction center CL of the half bearings 31 and 32, the present invention is not limited thereto. The center of the length of the inclined surface portion 72 in the circumferential direction may be located at a point other than the circumferential-direction center CL of the half bearings 31 and 32. Also, although the length of the inclined surface portion 72 in the circumferential direction is longer than the length of the first curved surface 7A in the circumferential direction, the present invention is not limited thereto. The length of the inclined surface portion 72 in the circumferential direction may be shorter than the length of the first curved surface 7A in the circumferential direction.

Although each of the first circumferential-direction groove 73 in the inclined surface portion 82 of the first curved surface 7A has the same groove depth D1, the same groove width W, and the same groove sectional areas 73A over the entire length of the inclined surface portion 72 in the circumferential direction, the groove inclination angle θ1 of the first circumferential-direction grooves 73 in the inclined surface portion 71 is a maximum angle at the center of the length of the inclined surface portion 72 in the circumferential direction and successively decreases toward both end portions of the length in the circumferential direction. The groove inclination angle θ1 of the first circumferential-direction grooves 73 in the inclined surface portion 72 is preferably the same dimension as that described above at the center portion of the length of the inclined surface portion 72 in the circumferential direction.

Although each second circumferential-direction groove 74 in the inclined surface portion 72 of the second curved surface 7B has the same groove depth D2, the same groove width W, and the same groove sectional area 74A over the entire length of the inclined surface portion 72 in the circumferential direction, the groove inclination angle θ1 of the second circumferential-direction grooves 74 in the inclined surface portion 71 is a maximum angle (the same as the groove inclination angle θ1 of the first circumferential-direction grooves 73 at the end portions of the inclined surface portion of the first curved surface 7A in the circumferential direction) at the center portion-side end portion of the length of the inclined surface portion 72 of the second curved surface 7B in the circumferential direction and successively decreases toward both end portions of the length in the circumferential direction.

Third Specific Example

Figure 12:
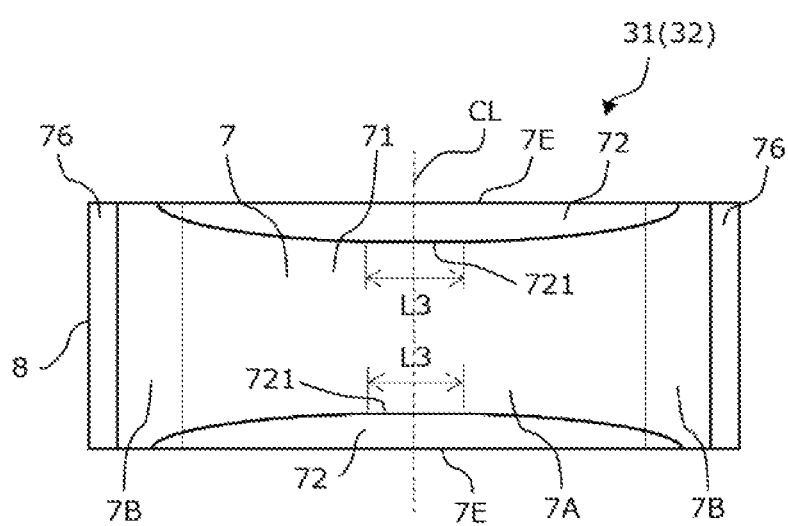
FIG. 12 is a plan view of a half bearing according to a third specific example of the present invention when seen from a sliding surface side.

FIG. 12 illustrates a plan view of the half bearings 31 and 32 according to a third specific example of the present invention when seen from the sliding surface side. The length of the inclined surface portion 72 in the circumferential direction is shorter than the length of the sliding surface 7 in the circumferential direction and forms a part of the length of the sliding surface 7 in the circumferential direction. FIG. 12 also provides illustration from which the first and second circumferential-direction grooves 73 and 74 are omitted. The other configurations are the same as the configurations of the half bearings 31 and 32 that have already been described.

The inclined surface portion 72 includes a parallel portion 721 where the width of the inclined surface portion 72 is constant, at the center of the length in the circumferential direction. The width L1 of the inclined surface portion 72 is a maximum width at the parallel portion 721 and successively decreases toward both end portions of the length in the circumferential direction. The inclined surface portion 72 has the maximum depth at the parallel portion 721, and the depth of the inclined surface portion 72 successively decreases toward both end portions of the length in the circumferential direction. The width L1 and the depth of the inclined surface portion 72 are preferably the dimensions described above in the parallel portion 721.

Although the center of the length L3 of the parallel portion 721 in the circumferential direction is located at the circumferential-direction center CL of the half bearings 31 and 32, the present invention is not limited thereto. The center of the length L3 of the parallel portion 721 in the circumferential direction may be located at a point other than the circumferential-direction center CL of the half bearings 31 and 32. Also, the length L3 of the parallel portion 721 in the circumferential direction is shorter than the length of the first curved surface 7A in the circumferential direction, the present invention is not limited thereto. The length L3 of the parallel portion 721 in the circumferential direction may be longer than the length of the first curved surface 7A in the circumferential direction.

Although each first circumferential-direction groove 73 in the inclined surface portion 72 in the first curved surface 7A has the same groove depth D1, the same groove width W, and the same groove sectional area 73A over the entire length of the inclined surface portion 72 in the circumferential direction, the groove inclination angle θ1 is constant and maximum over the entire length L3 of the parallel portion 721 in the circumferential direction and successively decreases from the end portion of the length L3 of the parallel portion 721 in the circumferential direction toward both end portions of the length of the inclined surface portion 72 of the first curved surface 7A in the circumferential direction. The groove inclination angle θ1 of the circumferential-direction grooves 73 in the inclined surface portion 72 is preferably the dimension described above in the parallel portion 721.

Although each second circumferential-direction groove 74 in the inclined surface portion 72 of the second curved surface 7B has the same groove depth D2, the same groove width W, and the same groove sectional area 74A over the entire length of the inclined surface portion 72 in the circumferential direction, the groove inclination angle θ1 of the second circumferential-direction grooves 74 in the inclined surface portion 71 is a maximum angle (the same as the groove inclination angle θ1 of the first circumferential-direction grooves 73 at the end portion of the inclined surface portion in the first curved surface 7A in the circumferential direction) at the center portion-side end portion of the length of the inclined surface portion 72 of the second curved surface 7B in the circumferential direction and successively decreases toward both end portions of the length in the circumferential direction.

Fourth Specific Example

Figure 13:
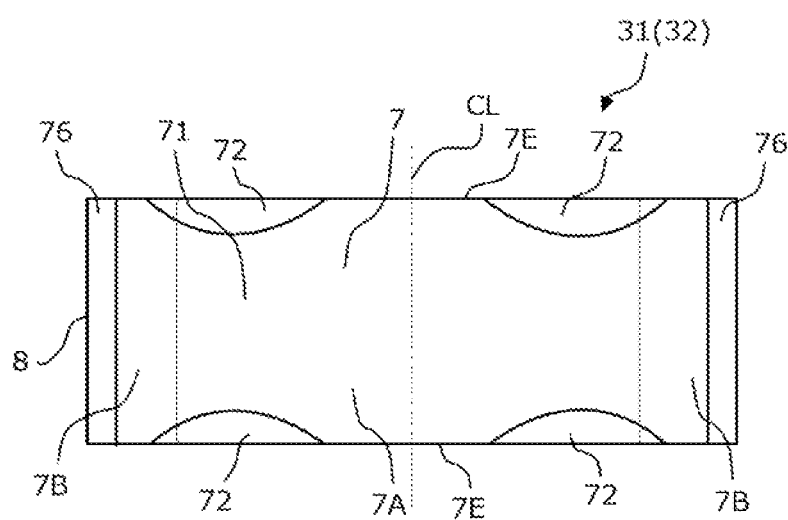
FIG. 13 is a plan view of the half bearing according to a fourth specific example of the present invention when seen from a sliding surface side.

FIG. 13 illustrates a plan view of the half bearings 31 and 32 according to a fourth specific example of the present invention when seen from the sliding surface side. Two inclined surface portions 72 with a shorter length in the circumferential direction than the length of the sliding surface 7 in the circumferential direction are formed at the end portions of the sliding surface of the half bearings 31 and 32 in the axial line direction. FIG. 13 also provides illustration from which the first and second circumferential-direction grooves 73 and 74 are omitted. The other configurations are the same as the configurations of the half bearings 31 and 32 that have already been described above.

Three or more inclined surface portions 72 may be provided at end portions of the sliding surface of the half bearings 31 and 32 in the axial line direction.

Fifth Specific Example

Figure 14:
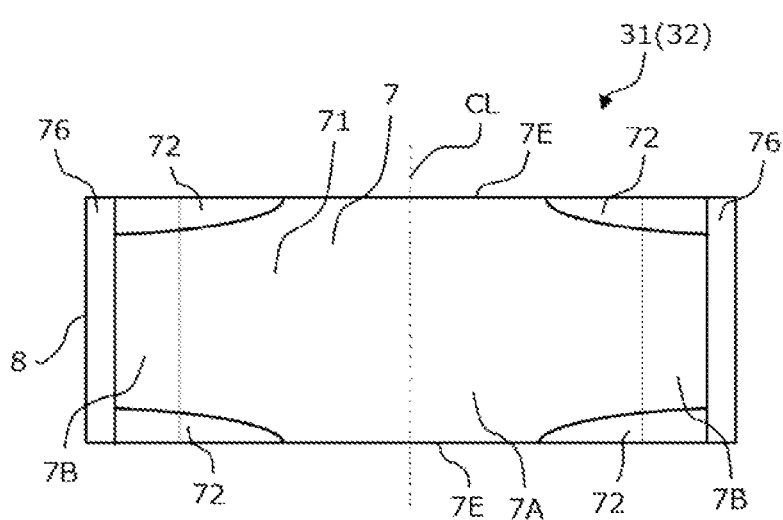
FIG. 14 is a plan view of a half bearing according to a fifth specific example of the present invention when seen from a sliding surface side.

FIG. 14 illustrates a plan view of the half bearings 31 and 32 according to a fifth specific example of the present invention when seen from the sliding surface side. Two inclined surface portions 72 with a shorter length in the circumferential direction than the length of the sliding surface 7 in the circumferential direction are formed at the end portions of the sliding surface of the half bearings 31 and 32 in the axial line direction. FIG. 14 also provides illustration from which the first and second circumferential-direction grooves 73 and 74 are omitted. The other configurations are the same as the configurations of the half bearings 31 and 32 that have already been described.

The width L1 of the inclined surface portion 72 is the maximum width at the end portion of the sliding surface 7 in the circumferential direction (the end portion in the circumferential direction on the side of the circumferential-direction end surface 76 of the half bearings 31 and 32 in the second curved surfaces 7B) and successively decreases toward the side of the circumferential-direction center CL of the half bearings 31 and 32. The inclined surface portion 72 has the maximum depth at the end portion of the sliding surface 7 in the circumferential direction (the end portion in the circumferential direction on the side of the circumferential-direction end surface 76 of the half bearings 31 and 32 in the second curved surface 7B), and the depth of the inclined surface portion 72 successively decreases toward the side of the circumferential-direction center CL of the half bearings 31 and 32.

The half bearing according to the present invention may be chamfered at both end portions of the sliding surface in the axial line direction. The chamfering is performed such that the angle formed between the chamfered surface and the surface of the plane portion 71 of the sliding surface 7 is equal to or greater than 25° (typically 45°). The chamfering is distinguished from the inclined surface portion 72 by the surface with no circumferential-direction groove formed therein.

Although the example in which the half bearing according to the present invention is applied to the conrod bearing that pivotally supports the crank pin of the crankshaft of the internal combustion engine has been illustrated in the above description, the half bearing according to the present invention can be applied to one of or both a pair of half bearings constituting a bearing such as a main bearing that pivotally supports a journal portion of a crankshaft, a bearing that pivotally supports a shaft member of a link mechanism unit of a variable compression ratio device of an internal combustion engine, or a bearing that pivotally supports a shaft member of a balancer device. Also, the half bearing may have an oil hole or an oil groove.

The invention claimed is:

1. A half bearing for an internal combustion engine constituting, by a combination of a pair of half bearings, a sliding bearing with a cylindrical shape, in which the half bearing has a semi-cylindrical shape and has a back surface on an outer circumferential surface side and a sliding surface on an inner circumferential surface side, the sliding surface includes first and second curved surfaces formed along two types of arcs with different curvatures, the first curved surface being a region including a circumferential-direction center portion of the sliding surface, the second curved surfaces being two remaining regions of the sliding surface that are continuous from the region of the first curved surface and extend toward both circumferential-direction end surfaces of the half bearing, and as a relationship between a center of a first arc that forms the first curved surface and a center of a second arc that forms the second curved surfaces, the center of the second arc being located at a position deviating further outward than the center of the first arc on a center line passing through a circumferential-direction center of the half bearing and the center of the first arc, formation ranges of the second curved surfaces are ranges at a circumferential angle θ2 of 20° at a minimum and 50° at a maximum from the circumferential-direction end surfaces of the half bearing around the center of the first arc, a plurality of circumferential-direction grooves are formed to be adjacent to each other in the sliding surface, the plurality of circumferential-direction grooves in the first curved surface of the sliding surface being first circumferential-direction grooves, the plurality of circumferential-direction grooves in the second curved surfaces of the sliding surface being second circumferential-direction grooves, the plurality of first circumferential-direction grooves are formed over an entire length of the first curved surface in the circumferential direction, and the plurality of first circumferential-direction grooves are formed over an entire width of the first curved surface, the plurality of second circumferential-direction grooves are formed over entire lengths of the second curved surfaces in the circumferential direction, and the plurality of second circumferential-direction grooves are formed over entire widths of the second curved surfaces, the first and second circumferential-direction grooves have curved recessed surfaces when seen in a section of the half bearing in an axial line direction, apex portions being formed between the recessed surfaces of the adjacent circumferential-direction grooves, a line connecting the apex portions representing the sliding surface, the sliding surface includes a plane portion that is parallel to the axial line direction and an inclined surface portion that is adjacent to the plane portion, the inclined surface portion being located at one of or both end portions of the sliding surface in the axial line direction, the inclined surface portion being displaced from the plane portion toward the end portion of the sliding surface in the axial line direction such that the sliding surface successively comes closer to the back surface, and the inclined surface portion is formed over at least a part of a length of the sliding surface in the circumferential direction, wherein groove widths of the first and second circumferential-direction grooves are defined as lengths of imaginary straight lines linearly connecting the apex portions on both sides of the first and second circumferential-direction grooves, groove center lines are defined as lines that pass through center positions of the lengths of the imaginary straight lines and extend in a normal direction with respect to the imaginary straight lines, groove depths of the first and second circumferential-direction grooves are defined as lengths to positions at which the recessed surfaces are the furthest from the imaginary straight lines in the normal direction with respect to the imaginary straight lines, and positions of maximum groove depths of the first and second circumferential-direction grooves are located on the groove center lines, areas that are surrounded by the imaginary straight lines and the recessed surfaces are defined as groove sectional areas, the plurality of first circumferential-direction grooves have the same groove widths, the same groove depths, and the same groove sectional areas, the groove widths, the groove depths, and the groove sectional areas of the first circumferential-direction grooves are the same at any position of the first curved surface in the circumferential direction, the plurality of second circumferential-direction grooves have the same groove widths, the same groove depths, and the same groove sectional areas, and the groove widths, the groove depths, and the groove sectional areas of the second circumferential-direction grooves are the same at any position of the second curved surfaces in the circumferential direction, the groove depths and the groove sectional areas of the second circumferential-direction grooves are larger than the groove depths and the groove sectional areas of the first circumferential-direction grooves, an angle formed by a vertical line extending in the vertical direction from the plane portion of the sliding surface toward an axial line of the half bearing and the groove center lines of the first and second circumferential-direction grooves is defined as a groove inclination angle θ1, and the groove inclination angle θ1 in the plane portion of the sliding surface is 0°, and the groove center lines of the first and second circumferential-direction grooves in the inclined surface portion of the sliding surface are inclined relative to the vertical line toward the end portion of the sliding surface in the axial line direction, the groove inclination angle θ1 of the first and second circumferential-direction grooves that are closest to the plane portion is a minimum angle, and the groove inclination angle θ1 successively increases toward the end portion of the sliding surface in the axial line direction.

2. The half bearing according to claim 1, wherein when the inclined surface portions are located at both end portions in the axial line direction, the inclined surface portions are formed symmetrically with respect to a center of the sliding surface in a width direction.

3. The half bearing according to claim 1, wherein a maximum width of the inclined surface portion is a length corresponding to 2 to 10% of a width of the sliding surface.

4. The half bearing according to claim 1, wherein at a position where the inclined surface portion has a maximum width, a depth of the inclined surface portion is 2 to 10 μm, and here, the depth of the inclined surface portion is a difference (T−T1) between a wall thickness T of the plane portion and a wall thickness T1 of the inclined surface portion at the end portion of the sliding surface in the axial line direction.

5. The half bearing according to claim 1, wherein the inclined surface portion has a maximum width and a maximum depth at a center portion of a length of the half bearing in the circumferential direction, and here, the depth of the inclined surface portion is a difference (T−T1) between a wall thickness T of the plane portion and a wall thickness T1 of the inclined surface portion at the end portion of the sliding surface in the axial line direction, and the width and the depth of the inclined surface portion successively decrease toward both end portions of the length of the half bearing in the circumferential direction.

6. The half bearing according to claim 5, wherein the inclined surface portion has a parallel portion with a constant length in the axial line direction at a position including the center portion of the length of the half bearing in the circumferential direction.

7. The half bearing according to claim 1, wherein the groove depth of the first circumferential-direction grooves is 1.5 to 5 μm, the groove depth of the second circumferential-direction grooves is two to five times as large as the groove depth of the first circumferential-direction grooves.

8. The half bearing according to claim 1, wherein the groove widths of the first and second circumferential-direction grooves are 0.05 to 0.25 mm.

9. The half bearing according to claim 1, wherein at a position where the inclined surface portion has a maximum width, the groove inclination angle θ1 of the first and second circumferential-direction grooves in the inclined surface portion that are closest to the end portion of the sliding surface in the axial line direction is $3 \times 10^{-2 \circ}$ to $30 \times 10^{-2 \circ}$.

10. A sliding bearing with a cylindrical shape that supports a shaft member of the internal combustion engine, the sliding bearing comprising: the half bearing according to claim 1.

11. The sliding bearing according to claim 10, wherein the sliding bearing is constituted by combining a pair of the half bearings.

* * * * *